United States Patent
Lee

(10) Patent No.: US 11,429,530 B2
(45) Date of Patent: Aug. 30, 2022

(54) DATA STORAGE DEVICE AND OPERATING METHOD THEREOF

(71) Applicant: SK hynix Inc., Gyeonggi-do (KR)

(72) Inventor: Seok Jun Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 271 days.

(21) Appl. No.: 16/677,907

(22) Filed: Nov. 8, 2019

(65) Prior Publication Data
US 2021/0034535 A1 Feb. 4, 2021

(30) Foreign Application Priority Data

Jul. 30, 2019 (KR) .................. 10-2019-0092252

(51) Int. Cl.
*G06F 12/0873* (2016.01)
*G06F 12/02* (2006.01)
*G06F 3/06* (2006.01)

(52) U.S. Cl.
CPC .......... *G06F 12/0873* (2013.01); *G06F 3/064* (2013.01); *G06F 3/0611* (2013.01); *G06F 3/0679* (2013.01); *G06F 12/0246* (2013.01); *G06F 2212/7201* (2013.01)

(58) Field of Classification Search
CPC ............. G06F 12/0873; G06F 12/0246; G06F 3/0611; G06F 3/064; G06F 3/0679; G06F 2212/7201
See application file for complete search history.

(56) References Cited

U.S. PATENT DOCUMENTS

| | | | | |
|---|---|---|---|---|
| 5,890,211 A | * | 3/1999 | Sokolov | G06F 3/0676 711/113 |
| 6,976,147 B1 | * | 12/2005 | Isaac | G06F 12/0862 711/137 |
| 2019/0102096 A1 | * | 4/2019 | Loewen | G06F 3/0625 |

FOREIGN PATENT DOCUMENTS

KR 1020030070119 8/2003
KR 1020180050883 5/2018

OTHER PUBLICATIONS

Chin-Hsien Wu, Tei-Wei Kuo, and Li Ping Chang. 2007. An efficient B-tree layer implementation for flash-memory storage systems. ACM Trans. Embed. Comput. Syst. 6, Jul. 3, 2007, 19-es. DOI:https://doi.org/10.1145/1275986.1275991 (Year: 2007).*

* cited by examiner

*Primary Examiner* — Kalpit Parikh
(74) *Attorney, Agent, or Firm* — IP & T Group LLP

(57) ABSTRACT

A data storage device may include: a nonvolatile memory configured to store L2P (Logical to Physical) map data and user data; and a controller configured to determine whether read commands which are sequentially transferred from a host device correspond to a backward sequential read, increase a backward sequential read count when the read commands are backward sequential read, set a pre-read start logical block address (LBA) and a length according to a preset condition, when the backward sequential read count is equal to or greater than a reference value, and load an L2P map of the corresponding LBA and user data corresponding to the L2P map from the nonvolatile memory in advance.

19 Claims, 10 Drawing Sheets

Sequential Read #1 | 13 | 14 | 15 | 16 | Backward LBA = 13 - 1

Sequential Read #2 | 10 | 11 | 12 | Backward LBA = 10 - 1

Pre Read #1 | 4 | 5 | 6 | 7 | 8 | 9

Sequential Read #3 | 6 | 7 | 8 | 9

Pre Read #2 | 0 | 1 | 2 | 3 | 4 | 5

Sequential Read #4 | 1 | 2 | 3 | 4 | 5

FIG.7

Sequential Read #1 | 13 | 14 | 15 | 16 |

Sequential Read #2 | 10 | 11 | 12 |

Sequential Read #3 | 1 | 2 | 3 | 4 |

1) Backward LBA = 13 - 1 = 12

2) Start LBA + Length = 10 + 2 = 12

3) 1) Backward LBA = Start LBA + Length = 12

4) Backward Sequential Read Counter 1++

5) Backward LBA = 10 - 1 = 9

6) Start LBA + Length = 1 + 3 = 4

7) 5) Backward LBA ≠ Start LBA + Length = 9 ≠ 4

8) Backward Sequential Read Counter Reset

DATA STORAGE DEVICE AND OPERATING METHOD THEREOF

CROSS-REFERENCE TO RELATED APPLICATION

The present application claims priority under 35 U.S.C. § 119(a) to Korean application number 10-2019-0092252, filed on Jul. 30, 2019, which is incorporated herein by reference in its entirety.

BACKGROUND

1. Technical Field

Various embodiments generally relate to a semiconductor device, and more particularly, to a data storage device and an operating method thereof.

2. Related Art

A data storage device using a semiconductor memory device has no mechanical driver, and thus has excellent stability and durability, high information access speed, and low power consumption, as compared to a hard disk storage device. Examples of a data storage device having such advantages include a USB (Universal Serial Bus) memory device, a memory card with various interfaces, a UFS (Universal Flash Storage) device, and an SSD (Solid State Drive).

The various types of data storage devices identified above may receive logical block addresses (LBAs) in units in reverse order from a host device, when a user retrieves files in the reverse order. For example, after receiving LBAs of 50 to 60 from the host device, the data storage device receives LBAs of 40 to 50, and receives LBAs of 30 to 40.

In this case, since the data storage device cannot perform pre-read, the data storage device may not provide relatively high data read speed to a user.

In this context, embodiments of the invention arise.

SUMMARY

Various embodiments are directed to a data storage device with enhanced read performance and an operating method thereof.

In an embodiment, a data storage device may include: a nonvolatile memory configured to store Logical to Physical (L2P) map data and user data; and a controller configured to determine whether read commands which are sequentially transferred from a host device correspond to a backward sequential read, increase a backward sequential read count when the read commands correspond to a backward sequential read, set a pre-read start logical block address (LBA) and a length according to a set condition, when the backward sequential read count is greater than or equal to a reference value, and load an L2P map of the corresponding LBA and user data corresponding to the L2P map from the nonvolatile memory in advance.

In an embodiment, an operating method of a data storage device may include the steps of: determining whether a read command corresponds to a backward sequential read connected to an LBA received during a previous read command, based on a start LBA and a length, when receiving the start LBA and the length from a host device; increasing a backward sequential read count, when it is determined that the read command corresponds to a backward sequential read; and setting a pre-read start LBA and a length according to a set condition, when the backward sequential read count is greater than or equal to a reference value, and loading an L2P map of a pre-read LBA and user data corresponding to the L2P map in advance.

In an embodiment, an operating method of a data storage device may include the steps of: receiving a read command along with a first start logical block address (LBA) and a first length associated with the read command; determining whether the read command corresponds to a backward sequential read linked to an LBA received with a previous read command based on a second LBA and a second length received with the read command; setting a pre-read start LBA and a pre-read length when it is determined that the read command corresponds to a backward sequential read, and a number of accumulated backward sequential reads is greater than or equal to a threshold number; and loading a logical to physical (L2P) map of a pre-read LBA and user data corresponding to the L2P map before performing a pre-read.

BRIEF DESCRIPTION OF THE DRAWINGS

FIGS. 5 to 7 are diagrams illustrating a pre-read method in accordance with an embodiment.

DETAILED DESCRIPTION

Embodiments of a data storage device and an operating method thereof are described below with reference to the accompanying drawings. Throughout the specification, reference to "an embodiment," "another embodiment" or the like is not necessarily to only one embodiment, and different references to any such phrase are not necessarily to the same embodiment(s).

Moreover, while various features and aspects of the present invention are disclosed, it should be apparent to those skilled in the art that other modifications are possible without departing from the inventive concepts disclosed herein. The present invention, therefore, is not limited to the disclosed embodiments nor to any specific detail disclosed herein. Rather, the present invention encompasses all modifications and variations that fall within the scope of the claims and their equivalents.

Open-ended terms, such as "comprising" and "including" are intended to refer to the stated elements or steps in a non-exclusive manner, meaning that other elements or steps may be combined with the stated elements or steps. Similarly, a singular reference, e.g., "a" or "an," is intended to include the plural, unless the context clearly indicates otherwise.

Figure 1:
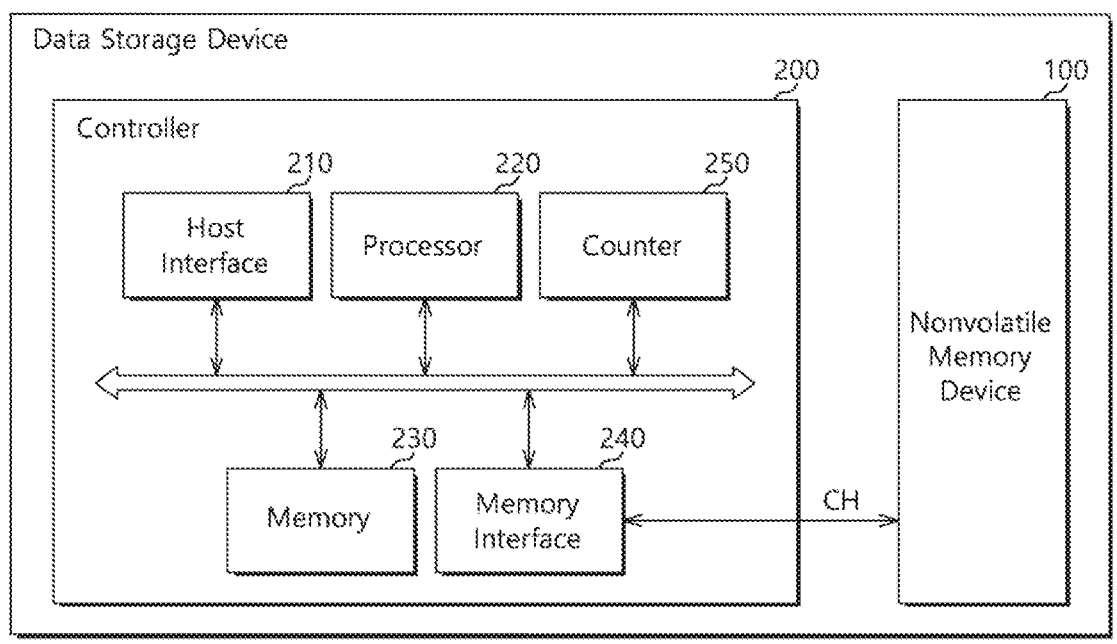
FIG. 1 is a diagram illustrating a configuration of a data storage device in accordance with an embodiment.

FIG. 1 illustrates a configuration of a data storage device 10 in accordance with an embodiment. The description in connection with FIG. 1 focuses on configuration details.

Other aspects of the data storage device 10, i.e., a pre-read method are described with reference to FIGS. 5 to 7.

Referring to FIG. 1, the data storage device 10 may store data accessed by a host device (not illustrated), such as a mobile phone, MP3 player, laptop computer, desktop computer, game machine, TV or in-vehicle infotainment system. The data storage device 10 may be referred to as a memory system.

The data storage device 10 may be configured as any of various types of storage devices, according to an interface protocol coupled to the host device. For example, the data storage device 10 may be configured as any of an SSD (Solid State Drive), an MMC (Multi-Media Card) such as an eMMC, RS-MMC or micro-MMC, an SD (Secure Digital) card such as a mini-SD or micro-SD, a USB (Universal Serial Bus) storage device, a UFS (Universal Flash Storage) device, a PCMCIA (Personal Computer Memory Card International Association) card-type storage device, a PCI (Peripheral Component Interconnection) card-type storage device, a PCI-E (PCI Express) card-type storage device, a CF (Compact Flash) card, a smart media card and/or a memory stick.

The data storage device 10 may be fabricated as any of various types of packages. For example, the data storage device 10 may be fabricated as any of a POP (Package-On-Package), SIP (System-In-Package), SOC (System-On-Chip), MCP (Multi-Chip Package), COB (Chip-On-Board), WFP (Wafer-level Fabricated Package) and/or WSP (Wafer-level Stack Package).

Referring to FIG. 1, the data storage device 10 may include a nonvolatile memory 100 and a controller 200.

In an embodiment, the nonvolatile memory 100 may store L2P (Logical to Physical) map data and user data, and provide the stored L2P map data and the user data corresponding to the L2P map data according to a pre-read command of the controller 200. This process is described below in more detail.

The nonvolatile memory 100 may operate as a storage medium of the data storage device 10. The nonvolatile memory 100 may be configured as any of various types of nonvolatile memories, such as a NAND flash memory, NOR flash memory, FRAM (Ferroelectric Random Access Memory) using a ferroelectric capacitor, MRAM (Magnetic Random Access Memory) using a TMR (Tunneling Magneto-Resistive) layer, PRAM (Phase Change Random Access Memory) using chalcogenide alloys, and/or ReRAM (Resistive Random Access Memory) using transition metal oxide, depending on memory cells.

Figure 2:
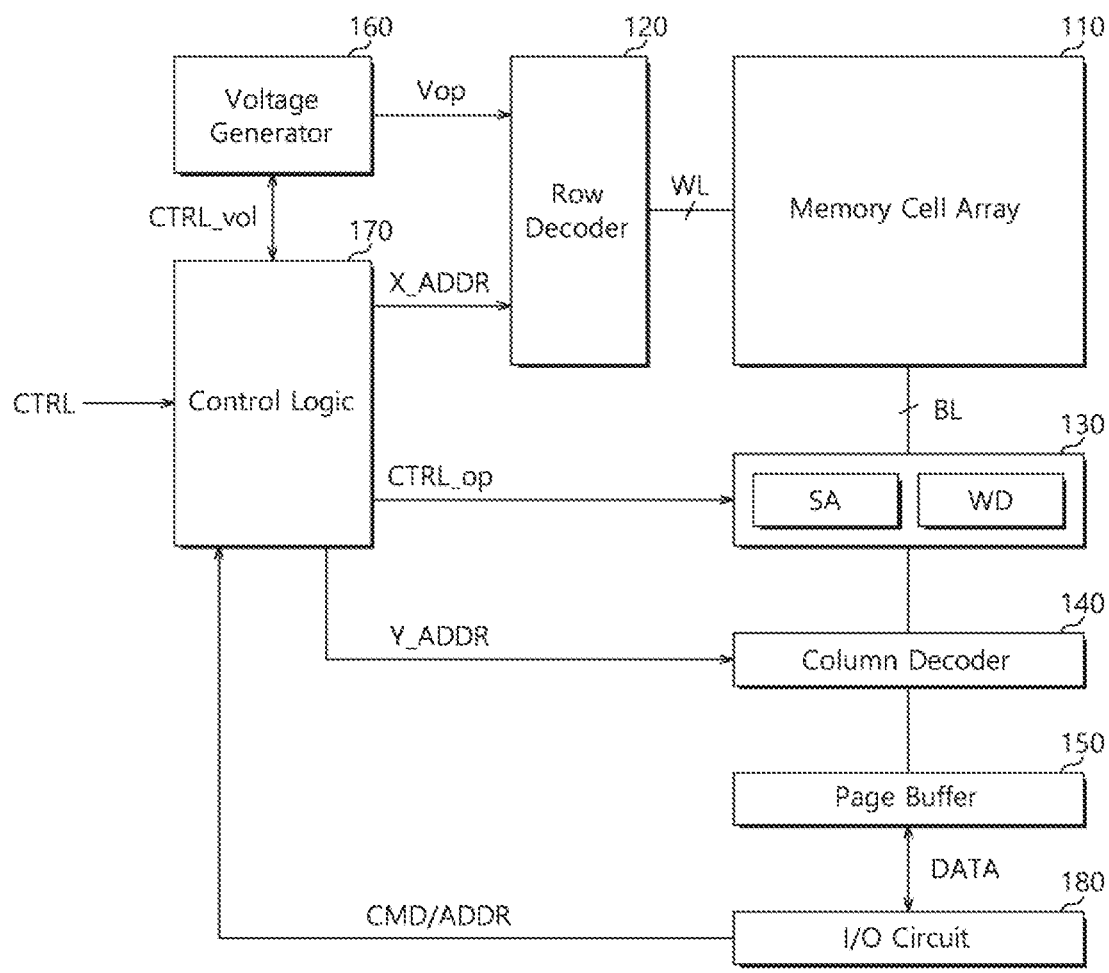
FIG. 2 is a diagram illustrating a configuration of a nonvolatile memory in accordance with an embodiment.
Figure 3:
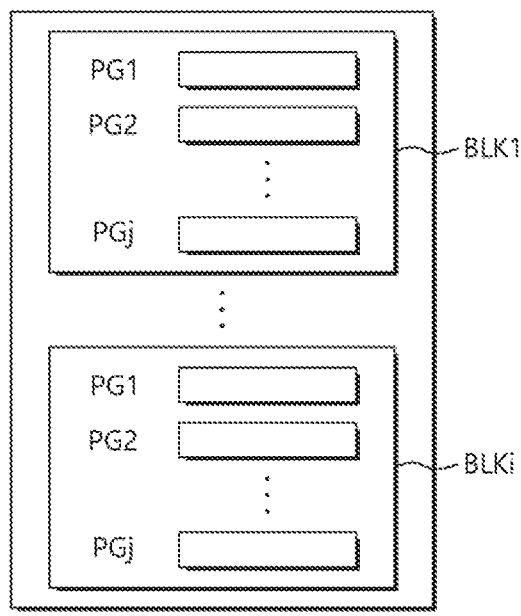
FIG. 3 is a diagram illustrating a configuration of a memory cell array in accordance with an embodiment.

FIG. 2 illustrates a configuration of the nonvolatile memory 100 of FIG. 1, and FIG. 3 illustrates a configuration of a memory cell array 110 of FIG. 2.

Referring to FIG. 2, the nonvolatile memory 100 may include the memory cell array 110, a row decoder 120, a write/read circuit 130, a column decoder 140, a page buffer 150, a voltage generator 160, control logic 170, and an input/output (I/O) circuit 180.

The memory cell array 110 may include a plurality of memory cells (not illustrated) arranged at the respective intersections between a plurality of bit lines BL and a plurality of word lines WL. Referring to FIG. 3, the memory cell array 110 may include a plurality of memory blocks BLK1 to BLKi, and each of the memory blocks BLK1 to BLKi may include a plurality of pages PG1 to PGj.

Each of the memory cells of the memory cell array 110 may be a single level cell (SLC) for storing one-bit data therein, a multi-level cell (MLC) for storing two-bit data therein, a triple level cell (TLC) for storing three-bit data therein or a quadruple level cell (QLC) for storing four-bit data therein. The memory cell array 110 may include one or more of the SLC, the MLC, the TLC and the QLC. The memory cell array 110 may include memory cells arranged with a two-dimensional horizontal structure or memory cells arranged with a three-dimensional vertical structure.

The row decoder 120 may be coupled to the memory cell array 110 through the word lines WL. The row decoder 120 may operate under control of the control logic 170. The row decoder 120 may decode a row address X_ADDR provided from the control logic 170, and select and drive one or more word lines WL based on the decoding result. The row decoder 120 may provide the selected word line(s) WL with an operating voltage Vop provided from the voltage generator 160.

The write/read circuit 130 may be coupled to the memory cell array 110 through the bit lines BL. The write/read circuit 130 may include write/read circuits (not illustrated) corresponding to the respective bit lines BL. The write/read circuit 130 may operate under control of the control logic 170. The write/read circuit 130 may include a write driver WD for writing data to memory cells and a sense amplifier SA for amplifying data read from memory cells. The write/read circuit 130 may provide a current pulse or voltage pulse to the memory cells selected by the row decoder 120 and the column decoder 140 to perform a write/read operation on the selected memory cells.

The column decoder 140 may operate under control of the control logic 170. The column decoder 140 may decode a column address Y_ADDR provided from the control logic 170. The column decoder 140 may couple the write/read circuits of the write/read circuit 130, corresponding to the respective bit lines BL, to the page buffer 150 based on the decoding result.

The page buffer 150 may temporarily store data provided from a memory interface 240 of the controller 200 to be written to the memory cell array 110, or data which are read from the memory cell array 110 to be provided to the memory interface 240 of the controller 200. The page buffer 150 may operate under control of the control logic 170.

The voltage generator 160 may generate various voltages for performing write, read and erase operations on the memory cell array 110, based on a voltage control signal CTRL_vol provided from the control logic 170. The voltage generator 160 may generate driving voltages Vop for driving the plurality of word lines WL and bit lines BL. The voltage generator 160 may generate one or more reference voltages to read data stored in a memory cell MC.

The control logic 170 may output various control signals for writing data DATA to the memory cell array 110 or reading data DATA from the memory cell array 110, based on a command CMD_op, an address ADDR and a control signal CTRL, which are received from the controller 200. The various control signals outputted from the control logic 170 may be provided to the row decoder 120, the write/read circuit 130, the column decoder 140, the page buffer 150 and the voltage generator 160. Thus, the control logic 170 may control various operations performed by the nonvolatile memory 100.

Specifically, the control logic 170 may generate an operation control signal CTRL_op based on the command CMD and the control signal CTRL, and provide the generated operation control signal CTRL_op to the write/read circuit 130. The control logic 170 may provide a row address X_ADDR and a column address Y_ADDR, which are included in the address ADDR, to the row decoder 120 and the column decoder 140, respectively.

The I/O circuit 180 may be configured to receive the command CMD, the address ADDR and the data DATA which are provided from the controller 200, or provide the controller 200 with the data DATA read from the memory cell array 110. The I/O circuit 180 may output the command CMD and the address ADD, which are received from the controller 200, to the control logic 170, and output the data DATA to the page buffer 150. The I/O circuit 180 may output the data DATA received from the page buffer 150 to the controller 200. The I/O circuit 180 may operate under control of the control logic 170.

In an embodiment, the controller 200 may determine whether read commands sequentially transferred from the host device (not illustrated) correspond to a backward sequential read, and increase a backward sequential read count when the read commands correspond to a backward sequential read. When the backward sequential read count is greater than or equal to a reference value, the controller 200 may set a pre-read start LBA and a length according to a set condition, and load an L2P map of the corresponding LBA and user data corresponding to the L2P map from the nonvolatile memory 100 in advance. The backward sequential read may indicate that files 1 to 4 are sequentially read in the following order: file 4, file 3, file 2 and file 1, under the supposition that files 1 to 4 are present as illustrated in FIG. 5.

The controller 200 may control overall operations of the data storage device 10 by driving firmware or software loaded in a memory 230. The controller 200 may decode and drive a code-based instruction or algorithm such as firmware or software. The controller 200 may be implemented in hardware or a combination of hardware and software.

Specifically, the controller 200 may include a host interface 210, a processor 220, the memory 230, a memory interface 240 and a counter 250.

The host interface 210 may interface the host device and the data storage device 10 in response to a protocol of the host device. For example, the host interface 210 may communicate with the host device through any of various protocols, such as USB (universal serial bus), UFS (universal flash storage), MMC (multimedia card), PATA (parallel advanced technology attachment), SATA (serial advanced technology attachment), SCSI (small computer system interface), SAS (serial attached SCSI), PCI (peripheral component interconnection) and/or PCI-e (PCI express).

In an embodiment, the processor 220 may set a backward LBA when receiving a start LBA and a length from the host device during a read command, and increase the backward sequential read count based on the start LBA, the length and the previous backward LBA, depending on whether the read command corresponds to a backward sequential read connected to the previous read command. The length may indicate the number of sequential LBAs, among all LBAs, excluding the start LBA transferred during the read command. Furthermore, the backward LBA may indicate an LBA obtained by subtracting 1 from the start LBA, and used for determining whether the LBA of each of the files read in reverse order corresponds to a backward sequential read connected to the LBA of the file read immediately before the corresponding file.

Specifically, when receiving a first start LBA and a first length from the host device with a read command, the processor 220 may set a value obtained by subtracting 1 from the first start LBA to a first backward LBA.

Figures 5, 6:
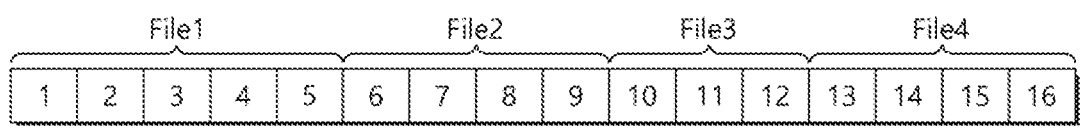

Referring to FIG. 5, the processor 220 may sequentially receive files 1 to 4 in reverse order from the host device. Referring to FIG. 6, the processor 220 may receive the first start LBA of 13 of file 3 and the first length of 3 from the host device during the read command, and sequential read #1 may correspond to 13, 14, 15 and 16. The processor 220 may set a value of 12 to the first backward LBA, the value of 12 being obtained by subtracting 1 from the first start LBA of 13. Then, the processor 220 may store the first backward LBA in the memory 230.

When receiving a second start LBA and a second length from the host device during the next read command, the processor 220 may check whether a value obtained by adding the second length to the received second start LBA is equal to the first backward LBA. When the result of the check indicates that the value is equal to the first backward LBA, the processor 220 may determine that the next read command corresponds to a backward sequential read.

Referring to FIG. 6, the processor 220 may receive the second start LBA of 10 and the second length of 2 from the host device during the read command, and sequential read #2 may correspond to 10, 11 and 12. The processor 220 may check that a value of 12, obtained by adding the second length of 2 to the second start LBA of 10, is equal to the first backward LBA of 12, and then determine that the read command corresponds to a backward sequential read.

The processor 220 may set a value obtained by subtracting 1 from the second start LBA to a second backward LBA, and store the second backward LBA in the memory 230.

Referring to FIG. 6, the processor 220 may set a value of 9, obtained by subtracting 1 from the second start LBA of 10, to the second backward LBA, and store the second backward LBA in the memory 230.

When the backward sequential read count is greater than or equal to the reference value, the processor 220 may set the pre-read start LBA and the length according to a set condition, and load an L2P map of a pre-read LBA and user data corresponding to the L2P map from the nonvolatile memory 100 in advance. The length may indicate the number of sequential LBAs among the entire LBAs except the start LBA, and have the same meaning as that during the read command.

Referring to FIG. 6, when the backward sequential read count is greater than or equal to the reference value, the processor 220 may load an L2P map for the LBAs of 4 to 9 in pre read #1 and user data corresponding to the L2P map in advance according to a set condition, and store the L2P map and the user data in the memory 230. Examples of the set condition according to which the processor 220 may set the pre-read start LBA and the length are described below.

In an embodiment, when the backward sequential read count is greater than or equal to the reference value, the processor 220 may set the pre-read start LBA and the length based on the previous LBA at the set length from the second backward LBA, and load an L2P map of the pre-read LBA and user data corresponding to the L2P map in advance.

In another embodiment, when the backward sequential read count is greater than or equal to the reference value, the processor 220 may set the pre-read start LBA and the length based on the average of the entire lengths of the LBAs during the previous backward sequential read, and load an L2P map of the pre-read LBA and user data corresponding to the L2P map in advance. The entire lengths of the LBAs may indicate the total length including the start LBA.

In still another embodiment, when the backward sequential read count is greater than or equal to the reference value, the processor 220 may set the pre-read start LBA and the length based on the total length of the longest LBA during the previous backward sequential read, and load an L2P map of the pre-read LBA and user data corresponding to the L2P map in advance.

The processor 220 may include a micro control unit (MCU) and a central processing unit (CPU). The processor 220 may process a request transferred from the host device. In order to process the request transferred from the host device, the processor 220 may drive a code-based instruction or algorithm loaded in the memory 230, i.e., firmware, and control the nonvolatile memory 100 and internal function blocks such as the host interface 210, the memory 230 and the memory interface 240.

The processor 220 may generate control signals for controlling an operation of the nonvolatile memory 100, based on requests transferred from the host device, and provide the generated control signals to the nonvolatile memory 100 through the memory interface 240.

In an embodiment, the memory 230 may store the backward LBA, the backward sequential read count, the pre-read information, an L2P map of the pre-read LBA and the user data corresponding to the L2P map.

The memory 230 may be configured as a RAM such as a dynamic RAM (DRAM) or static RAM (SRAM). The memory 230 may store the firmware driven by the processor 220. Furthermore, the memory 230 may store data for driving the firmware, for example, metadata. That is, the memory 230 may operate as a working memory of the processor 220.

The memory 230 may include a data buffer (DB) for temporarily storing write data to be transferred to the nonvolatile memory 100 from the host device or read data to be transferred to the host device from the nonvolatile memory 100. That is, the memory 230 may operate as a buffer memory.

The memory interface 240 may control the nonvolatile memory 100 under control of the processor 220. The memory interface 240 may also be referred to as a memory controller. The memory interface 240 may provide control signals to the nonvolatile memory 100. The control signals may include a command CMD, an address ADDR, an operation control signal CTRL and the like for controlling the nonvolatile memory 100. The memory interface 240 may provide data DATA to the nonvolatile memory 100, or receive data DATA from the nonvolatile memory 100.

Although not illustrated, the memory interface 240 may include a write cache for temporarily storing data which are transmitted/received when a write operation is performed on the nonvolatile memory 100 and a read cache for temporarily storing data which are transmitted/received when a read operation is performed on the nonvolatile memory 100. In an embodiment, the memory interface 240 may increase the size of the read cache to a size larger than the default size, in order to raise the performance of the sequential read.

Whenever a read command corresponds to a backward sequential read, the counter 250 may increase the backward sequential read count, and store the corresponding information in the memory 230.

The counter 250 may reset the backward sequential read count when backward sequential read is not sequential.

Specifically, when a value obtained by adding the length to the start LBA received from the host device is not equal to the previous backward LBA, the counter 250 may determine that the read command does not correspond to a backward sequential read, and reset the backward sequential read count. The backward LBA may indicate an LBA obtained by subtracting 1 from the start LBA, and is used for determining whether the LBA of each of the files read in reverse order corresponds to backward sequential read connected to the LBA of the file read immediately before the corresponding file.

As illustrated in FIG. 7, when the LBAs of sequential read #3 of the third read command are not 6, 7, 8 and 9 but 1, 2, 3 and 4 (see (6)) while the LBAs of the sequential read #1 of the first read command, which the controller 200 sequentially receives from the host device, are 13, 14, 15 and 16 (see (1)) and the LBAs of the sequential read #2 of the second read command are 10, 11 and 12 (see (2)), the counter 250 may determine that the sequential read #3 is not a backward sequential read connected to the sequential read #2 (see (7)), and thus reset the backward sequential read count (see (8)).

Figure 4:
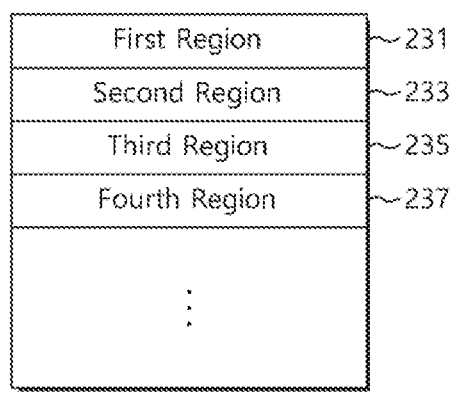
FIG. 4 is a diagram illustrating a memory of FIG. 1.

FIG. 4 is a diagram illustrating a memory of FIG. 1.

Referring to FIG. 4, the memory 230 in accordance with an embodiment may include a first region 231, a second region 233, a third region 235 and a fourth region 237. Although FIG. 4 illustrates that the memory 230 includes four regions, the memory 230 may further include other regions for storing various data. For example, the memory 230 may further include a command queue region for queuing commands which are generated based on requests received from the host device.

The first region 231 of the memory 230 may store a flash translation layer (FTL). The FTL may be software driven by the processor 220, and the processor 220 may drive the FTL to control a unique operation of the nonvolatile memory 100, and provide device compatibility to the host device. As the FTL is driven, the data storage device 10 may be recognized and used as a general data storage device such as a hard disk by the host device. The FTL may include modules for performing various functions. The FTL may be stored in a system region (not illustrated) of the nonvolatile memory 100. When the data storage device 10 is powered on, the FTL may be read from the system region of the nonvolatile memory 100 and loaded to the first region 231 of the memory 230.

The second region 233 of the memory 230 may store backward LBAs B_LBA which are generated by the processor 220 in response to sequential read requests received from the host device.

The third region 235 of the memory 230 may include the backward sequential read count and the pre-read information. The backward sequential read count may indicate counting information, such as the number of sequential backward reads. The pre-read information may include the start LBA and the last LBA, which are stored in the memory 230 and pre-read from the nonvolatile memory 100. More generally, the pre-read information may include any information from which a pre-read L2P map and user data corresponding to the L2P map can be identified. In the present embodiment, it has been exemplified that the backward sequential read count and the pre-read information are stored in the same memory region. However, the present invention is not limited thereto; the backward sequential read count and the pre-read information may be separately stored in different memory regions.

The fourth region 237 of the memory 230 may store the L2P map of the LBA pre-read from the nonvolatile memory 100 and the user data corresponding to the L2P map.

Although not illustrated, the memory 230 may include an address buffer (AB) and a meta region. The AB may map a write address received from the host device, i.e. an LBA, to an actual address of the nonvolatile memory 100, i.e. a physical block address (PBA), and store the mapped addresses therein. The meta region may store meta data for driving various modules included in the FTL. A P2L (Physical-to-Logical) table may be stored in the meta region.

The memory 230 may further include a write buffer, a read buffer, a map update buffer and the like. The write buffer may be configured to temporarily store write data which are to be transferred to the nonvolatile memory 100 from the host device. The read buffer may be configured to temporarily store read data which are read from the nonvolatile memory 100 and will be transferred to the host device. The map update buffer may be configured to temporarily store a map segment whose mapping information is to be updated.

Figure 8:
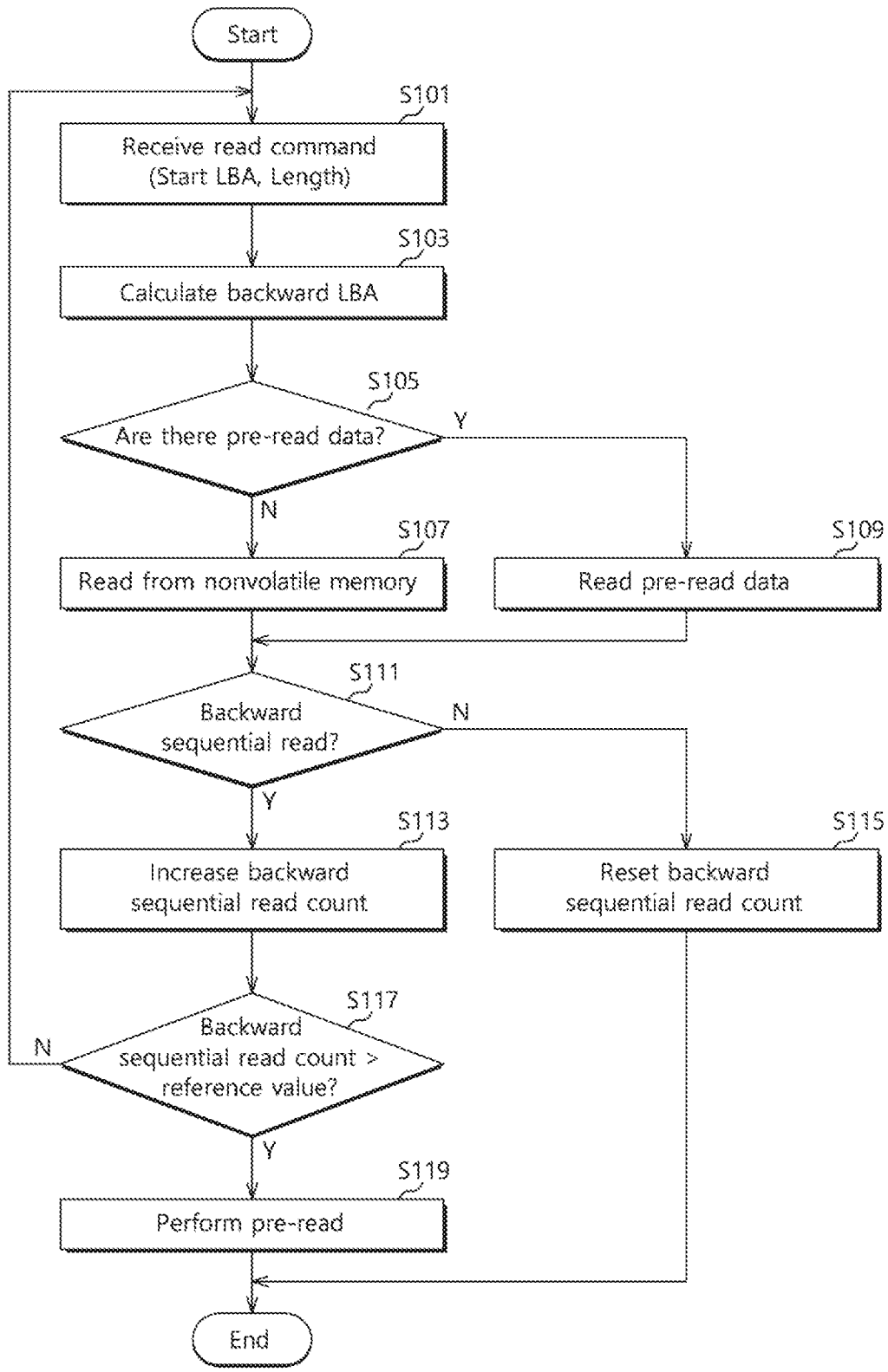
FIG. 8 is a flowchart illustrating an operating method of a data storage device in accordance with an embodiment.

FIG. 8 is a flowchart illustrating an operating method of a data storage device in accordance with an embodiment.

When receiving a start LBA and a length from the host device (not illustrated) in connection with a read command, the data storage device 10 may determine whether the read command corresponds to a backward sequential read connected to an LBA received with a previous read command, based on the start LBA and the length.

Referring to FIG. 8, the data storage device 10 may receive a second start LBA and a second length which are transferred from the host device during the read command, in step S101.

Then, the data storage device 10 may store a value obtained by subtracting 1 from the second start LBA as a second backward LBA in step S103.

Then, when there are no pre-read data corresponding to the second start LBA and the second length which are transferred during the read command, the data storage device 10 may read data corresponding to the read command from the nonvolatile memory 100 in steps S105 and S107.

When there are pre-read data corresponding to the second start LBA and the second length, the data storage device 10 may read the corresponding pre-read data from the memory 230 in step S109.

Then, the data storage device 10 may check whether a value obtained by adding the second length to the received second start LBA is equal to a first backward LBA, in step S111.

Although not illustrated, the data storage device 10 may receive a first start LBA and a first length which are transferred from the host device during the read command, before step S111. Furthermore, the data storage device 10 may store a value obtained by subtracting 1 from the first start LBA as a first backward LBA. As the teachings herein indicate the process of FIG. 8 can be performed according to the first start LBA and the first length.

When the result of the check in step S111 indicates that the read command corresponds to a backward sequential read, the data storage device 10 may increase the backward sequential read count in step S113.

When the result of the check in step S111 indicates that the read command does not correspond to backward sequential read, the data storage device 10 may reset the backward sequential read count in step S115.

When the backward sequential read count is greater than or equal to a reference value, the data storage device 10 may set a pre-read start LBA and a length according to a set condition, as described above, and load an L2P map of a pre-read LBA and user data corresponding to the L2P map in advance, in steps S117 and S119.

In an embodiment, when the backward sequential read count is greater than or equal to the reference value, the data storage device 10 may set the pre-read start LBA and the length based on a previous LBA at a set length from the second backward LBA, and load the L2P map of the pre-read LBA and the user data corresponding to the L2P map in advance.

In another embodiment, when the backward sequential read count is greater than or equal to the reference value, the data storage device 10 may set the pre-read start LBA and the length based on the average of the entire lengths of the LBAs during the previous backward sequential read, and load the L2P map of the pre-read LBA and the user data corresponding to the L2P map in advance.

In still another embodiment, when the backward sequential read count is greater than or equal to the reference value, the data storage device 10 may set the pre-read start LBA and the length based on the total length of the longest LBA during the previous backward sequential read, and load the L2P map of the pre-read LBA and the user data corresponding to the L2P map in advance.

Step S119 of loading the L2P map and the user data corresponding to the L2P map in advance may be completed before the next read command is received from the host device.

Figure 9:
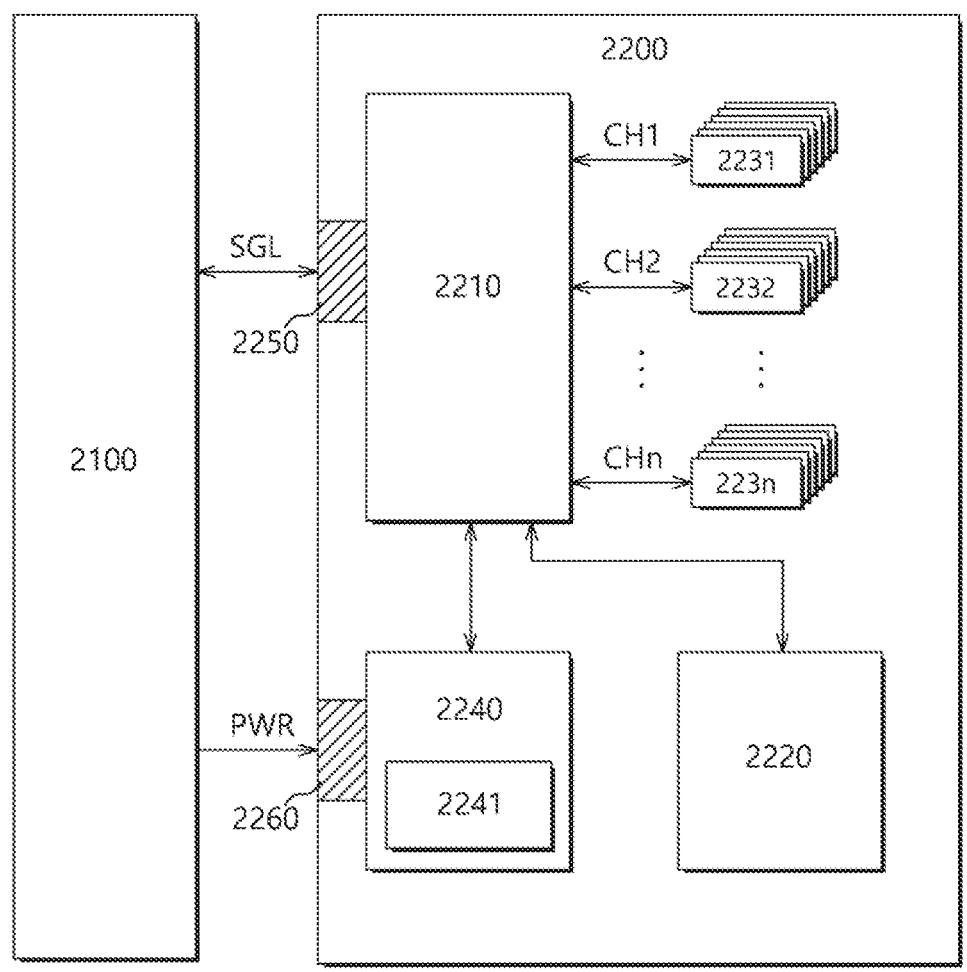
FIG. 9 is a diagram illustrating a data processing system including a solid state drive (SSD) in accordance with an embodiment.

FIG. 9 illustrates a data processing system including a solid state drive (SSD) in accordance with an embodiment. Referring to FIG. 9, the data processing system 2000 may include a host device 2100 and an SSD 2200.

The SSD 2200 may include a controller 2210, a buffer memory device 2220, nonvolatile memories 2231 to 223$n$, a power supply 2240, a signal connector 2250 and a power connector 2260.

The controller 2210 may control overall operations of the SSD 2200.

The buffer memory device 2220 may temporarily store data to be stored in the nonvolatile memories 2231 to 223$n$. The buffer memory device 2220 may temporarily store data read from the nonvolatile memories 2231 to 223$n$. The data temporarily stored in the buffer memory device 2220 may be transmitted to the host device 2100 or the nonvolatile memories 2231 to 223$n$ under control of the controller 2210.

The nonvolatile memories 2231 to 223$n$ may be used as storage media of the SSD 2200. The nonvolatile memories 2231 to 223$n$ may be coupled to the controller 2210 through a plurality of channels CH1 to CHn, respectively. One channel may be coupled to one or more nonvolatile memories. The nonvolatile memories coupled to the same channel may be coupled to the same signal bus and data bus.

The power supply 2240 may provide power PWR inputted through the power connector 2260 into the SSD 2200. The power supply 2240 may include an auxiliary power supply 2241. The auxiliary power supply 2241 may supply power to properly shut down the SSD 2200, when a sudden power off occurs. The auxiliary power supply 2241 may include large capacitors capable of storing power PWR.

The controller 2210 may exchange signals SGL with the host device 2100 through the signal connector 2250. The signal SGL may include a command, an address, data and the like. The signal connector 2250 may be configured as any of various types of connectors depending on the interface between the host device 2100 and the SSD 2200.

Figure 10:
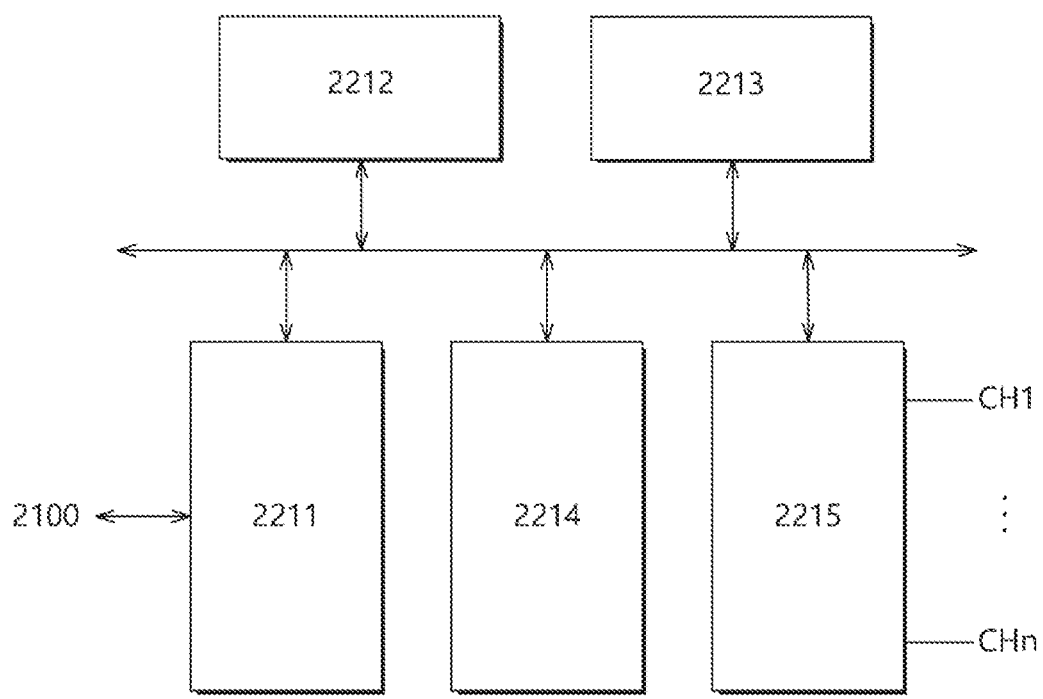
FIG. 10 is a diagram illustrating a configuration of a controller of FIG. 9.

FIG. 10 is a diagram illustrating the configuration of the controller of FIG. 9. Referring to FIG. 10, the controller 2210 may include a host interface 2211, a control component 2212, a RAM 2213, an ECC (Error Correction Code) component 2214 and a memory interface 2215.

The host interface 2211 may interface the host device 2100 and the SSD 2200 according to a protocol of the host device 2100. For example, the host interface 2211 may communicate with the host device 2100 through one or more of protocols, such as SD (Secure Digital), USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express) and/or UFS (Universal Flash Storage). The host interface 2211 may perform a disk emulation function for supporting the host device 2100 to recognize the SSD 2200 as a general-purpose data storage device, for example, an HDD (Hard Disk Drive).

The control component 2212 may analyze and process a signal SGL inputted from the host device 2100. The control component 2212 may control operations of the internal function blocks according to firmware or software for driving the SSD 2200. The RAM 2213 may be used as a working memory for driving such firmware or software.

The ECC component 2214 may generate parity data of data to be transmitted to the nonvolatile memories 2231 to 223n. The generated parity data may be stored in the nonvolatile memories 2231 to 223n with the data. The ECC component 2214 may detect an error of data read from the nonvolatile memories 2231 to 223n, based on the parity data. When the detected error falls within a correctable range, the ECC component 2214 may correct the detected error.

The memory interface 2215 may provide a control signal such as a command and address to the nonvolatile memories 2231 to 223n, under control of the control component 2212. The memory interface 2215 may exchange data with the nonvolatile memories 2231 to 223n, under control of the control component 2212. For example, the memory interface 2215 may provide data stored in the buffer memory device 2220 to the nonvolatile memories 2231 to 223n, or provide data read from the nonvolatile memories 2231 to 223n to the buffer memory device 2220.

Figure 11:
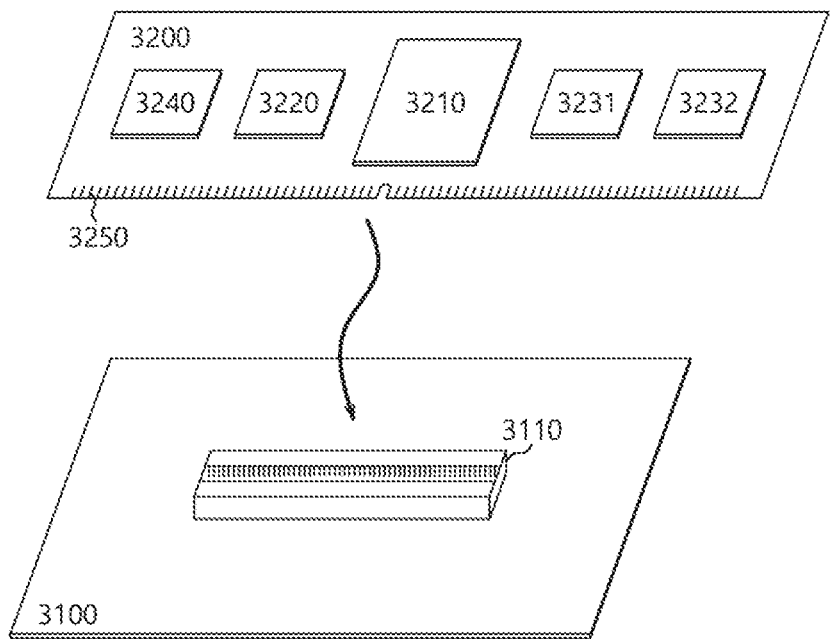
FIG. 11 is a diagram illustrating a data processing system including a data storage device in accordance with an embodiment.

FIG. 11 illustrates a data processing system including a data storage device in accordance with an embodiment. Referring to FIG. 11, a data processing system 3000 may include a host device 3100 and a data storage device 3200.

The host device 3100 may be configured in the form of a board such as a printed circuit board. Although not illustrated, the host device 3100 may include internal function blocks for performing the function of the host device.

The host device 3100 may include a connection terminal 3110 such as a socket, slot or connector. The data storage device 3200 may be mounted on the connection terminal 3110.

The data storage device 3200 may be configured in the form of a board such as a printed circuit board. The data storage device 3200 may be referred to as a memory module or memory card. The data storage device 3200 may include a controller 3210, a buffer memory device 3220, nonvolatile memories 3231 and 3232, a PMIC (Power Management Integrated Circuit) 3240 and a connection terminal 3250.

The controller 3210 may control overall operations of the data storage device 3200. The controller 3210 may be configured in the same manner as the controller 2210 illustrated in FIG. 10.

The buffer memory device 3220 may temporarily store data to be stored in the nonvolatile memories 3231 and 3232. The buffer memory device 3220 may temporarily store data read from the nonvolatile memories 3231 and 3232. The data temporarily stored in the buffer memory device 3220 may be transmitted to the host device 3100 or the nonvolatile memories 3231 and 3232 under control of the controller 3210.

The nonvolatile memories 3231 and 3232 may be used as storage media of the data storage device 3200.

The PMIC 3240 may provide power inputted through the connection terminal 3250 into the data storage device 3200. The PMIC 3240 may manage power of the data storage device 3200 under control of the controller 3210.

The connection terminal 3250 may be connected to the connection terminal 3110 of the host device. Through the connection terminal 3250, power and signals such as commands, addresses and data may be transferred between the host device 3100 and the data storage device 3200. The connection terminal 3250 may be configured in any of various ways depending on the interface method between the host device 3100 and the data storage device 3200. The connection terminal 3250 may be disposed on any side of the data storage device 3200.

Figure 12:
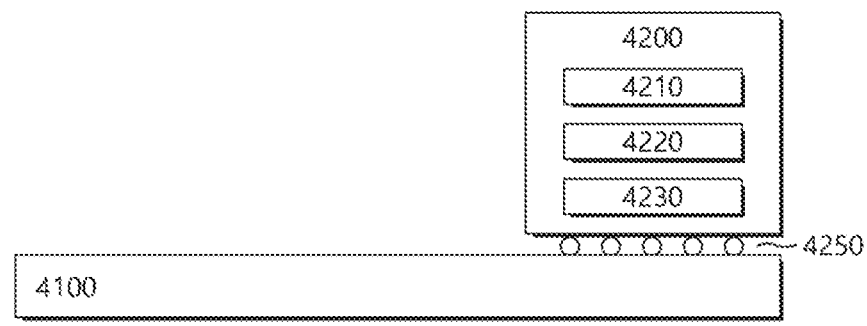
FIG. 12 is a diagram illustrating a data processing system including a data storage device in accordance with an embodiment.

FIG. 12 illustrates a data processing system including a data storage device in accordance with an embodiment. Referring to FIG. 12, a data processing system 4000 may include a host device 4100 and a data storage device 4200.

The host device 4100 may be configured in the form of a board such as a printed circuit board. Although not illustrated, the host device 4100 may include internal function blocks for performing the function of the host device.

The data storage device 4200 may be configured in the form of a surface mount package. The data storage device 4200 may be mounted on the host device 4100 through solder balls 4250. The data storage device 4200 may include a controller 4210, a buffer memory device 4220 and a nonvolatile memory 4230.

The controller 4210 may control overall operations of the data storage device 4200. The controller 4210 may be configured in the same manner as the controller 2210 illustrated in FIG. 10.

The buffer memory device 4220 may temporarily store data to be stored in the nonvolatile memory 4230. The buffer memory device 4220 may temporarily store data read from the nonvolatile memory 4230. The data temporarily stored in the buffer memory device 4220 may be transmitted to the host device 4100 or the nonvolatile memory 4230 under control of the controller 4210.

The nonvolatile memory 4230 may be used as a storage medium of the data storage device 4200.

Figure 13:
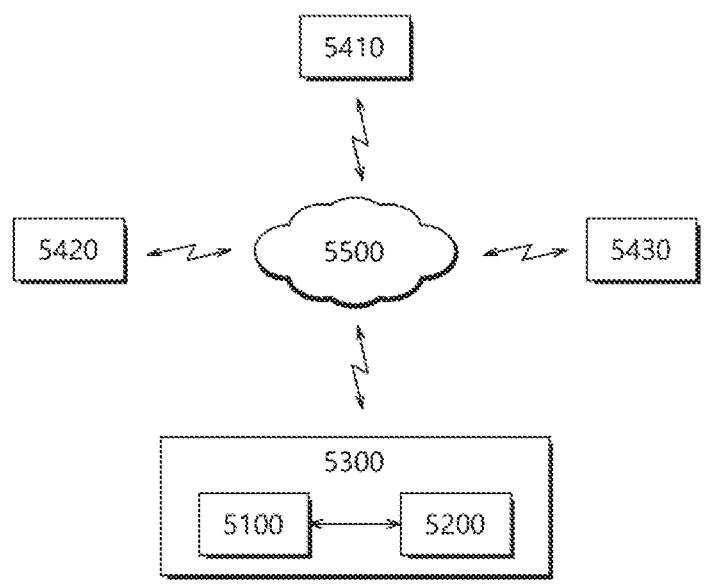
FIG. 13 is a diagram illustrating a network system including a data storage device in accordance with an embodiment.

FIG. 13 illustrates a network system 5000 including a data storage device in accordance with an embodiment. Referring to FIG. 13, the network system 5000 may include a server system 5300 and a plurality of client systems 5410, 5420 and 5430 connected through a network 5500.

The server system 5300 may serve data in response to requests from the plurality of client systems 5410, 5420 and 5430. For example, the server system 5300 may store data provided from the plurality of client systems 5410, 5420 and 5430. For another example, the server system 5300 may provide data to the plurality of client systems 5410, 5420 and 5430.

The server system 5300 may include a host device 5100 and a data storage device 5200. The data storage device 5200 may be configured as the data storage device 10 of FIG. 1, the data storage device 2200 of FIG. 11, the data storage device 3200 of FIG. 13 or the data storage device 4200 of FIG. 14.

In accordance with embodiments of the present invention, since the data storage device determines whether a read command transferred from the host device corresponds to a backward sequential read and performs pre-read, the read performance of the data storage device can be improved. Thus, according to embodiments of present invention, the improvements to the data storage device can provide to a user a better QoS (Quality of Service) experience with improved data read speed, even though files are read in reverse order from the viewpoint of the user.

While various embodiments have been illustrated and described herein, it will be understood to those skilled in the art in light of the present disclosure that the disclosed embodiments are examples only. Accordingly, the present invention is not limited by or to the described embodiments. Rather, the present invention encompasses all modifications and variations that fall within the scope of the claims and their equivalents.

What is claimed is:

1. A data storage device comprising:
   a nonvolatile memory configured to store Logical to Physical (L2P) map data and user data; and
   a controller configured to determine whether read commands which are sequentially transferred from a host device correspond to a backward sequential read, increase a backward sequential read count when the read commands correspond to a backward sequential read, set a pre-read start logical block address (LBA) and a length according to a set condition, when the backward sequential read count is greater than or equal to a reference value, and load an L2P map of the corresponding LBA and user data corresponding to the L2P map from the nonvolatile memory in advance,
   wherein the controller sets a backward LBA based on a start LBA and a length received from the host device and determines whether the read commands correspond to the backward sequential read based on the backward LBA, the start LBA, and the length.

2. The data storage device according to claim 1, wherein the controller comprises:
   a processor configured to set the backward LBA when receiving the start LBA and the length from the host device with a read command, increase the backward sequential read count based on the start LBA, the length and a previous backward LBA, depending on whether the read command corresponds to a backward sequential read connected to the previous read command, set the pre-read start LBA and the length according to the set condition, when the backward sequential read count is greater than or equal to the reference value, and load an L2P map of a pre-read LBA and user data corresponding to the L2P map from the nonvolatile memory in advance;
   a counter register configured to increase the backward sequential read count whenever the read command corresponds to backward sequential read, and store the backward sequential read count in a memory; and
   the memory configured to also store the backward LBA, pre-read information, an L2P map of a pre-read LBA and user data corresponding to the L2P map.

3. The data storage device according to claim 2, when receiving a first start LBA and a first length from the host device with a read command, the processor sets a value obtained by subtracting 1 from the first start LBA to a first backward LBA.

4. The data storage device according to claim 3, wherein when receiving a second start LBA and a second length from the host device with a next read command, the processor checks whether a value obtained by adding the second length to the received second start LBA is equal to the first backward LBA, and determines that the next read command corresponds to the backward sequential read when the result of the check indicates that the value is equal to the first backward LBA.

5. The data storage device according to claim 4, wherein the processor decides a value obtained by subtracting 1 from the second start LBA as a second backward LBA, and stores the second backward LBA in the memory.

6. The data storage device according to claim 5, wherein when the backward sequential read count is greater than or equal to the reference value, the processor sets the pre-read start LBA and the length based on a previous LBA at a set length from the second backward LBA, and loads the L2P map of the pre-read LBA and user data corresponding to the L2P map in advance.

7. The data storage device according to claim 5, wherein when the backward sequential read count is greater than or equal to the reference value, the processor sets the pre-read start LBA and the length based on an average of entire lengths of the LBAs during a previous backward sequential read, and loads the L2P map of the pre-read LBA and the user data corresponding to the L2P map in advance.

8. The data storage device according to claim 5, wherein when the backward sequential read count is greater than or equal to the reference value, the processor sets the pre-read start LBA and the length based on total length of a longest LBA during a previous backward sequential read, and loads the L2P map of the pre-read LBA and the user data corresponding to the L2P map in advance.

9. The data storage device according to claim 2, wherein when the read command does not correspond to a backward sequential read, the counter register resets the backward sequential read count.

10. An operating method of a data storage device, comprising:
    setting a backward logical block address (LBA) based on a start LBA and a length received from a host device and determining whether a read command corresponds to a backward sequential read connected to an LBA received during a previous read command, based on the backward LBA, the start LBA and the length;
    increasing a backward sequential read count, when it is determined that the read command corresponds to a backward sequential read; and
    setting a pre-read start LBA and a length according to a set condition, when the backward sequential read count is greater than or equal to a reference value, and loading an L2P map of a pre-read LBA and user data corresponding to the L2P map in advance.

11. The operating method according to claim 10, wherein the setting of the backward LBA and the determining of whether the read command corresponds to the backward sequential read comprises:
    receiving a first start LBA and a first length from the host device with the read command;
    storing a value obtained by subtracting 1 from the first start LBA as a first backward LBA; and checking whether a value obtained by adding a second length to a second start LBA is equal to the first backward LBA, when receiving the second start LBA and the second length from the host device during a next read command.

12. The operating method according to claim 11, wherein the increasing of the backward sequential read count comprises increasing the backward sequential read count when the result of the checking indicates the value is equal to the first backward LBA.

13. The operating method according to claim 11, wherein the checking of whether the value is equal to the first backward LBA comprises storing a value obtained from subtracting 1 from the second start LBA as a second backward LBA.

14. The operating method according to claim 13, wherein the loading of the L2P map of the pre-read LBA and the user data corresponding to the L2P map in advance further comprises setting the pre-read start LBA and the length based on a previous LBA at a set length from the second backward LBA, when the backward sequential read count is greater than or equal to the reference value.

15. The operating method according to claim 13, wherein the loading of the L2P map of the pre-read LBA and the user data corresponding to the L2P map in advance further comprises setting the pre-read start LBA and the length based on an average of entire lengths of LBAs during a previous backward sequential read, when the backward sequential read count is greater than or equal to the reference value.

16. The operating method according to claim 13, wherein the loading of the L2P map of the pre-read LBA and the user data corresponding to the L2P map in advance further comprises setting the pre-read start LBA and the length based on total length of a longest LBA during a previous backward sequential read, when the backward sequential read count is greater than or equal to the reference value.

17. The operating method according to claim 10, further comprising resetting the backward sequential read count when the read command does not correspond to a backward sequential read.

18. The operating method according to claim 10, wherein the loading of the L2P map and the user data corresponding to the L2P map in advance is completed before a next read command is received from the host device.

19. A method of operating a device, the method comprising:
  receiving a read command along with a start logical block address (LBA) and a length associated with the read command;
  setting a backward LBA based on the start LBA and the length and determining whether the read command corresponds to a backward sequential read linked to an LBA received with a previous read command based on backward LBA, the start LBA and the length received with the read command;
  setting a pre-read start LBA and a pre-read length when it is determined that the read command corresponds to a backward sequential read, and a number of accumulated backward sequential reads is greater than or equal to a threshold number; and
  loading a logical to physical (L2P) map of a pre-read LBA and user data corresponding to the L2P map before performing a pre-read.

* * * * *